United States Patent [19]
Lee

[11] Patent Number: 5,903,326
[45] Date of Patent: May 11, 1999

[54] METHODS OF FORMING LIQUID CRYSTAL DISPLAY DEVICES, AND DEVICES FORMED THEREBY

[75] Inventor: Jueng-gil Lee, Kyungki-do, Rep. of Korea

[73] Assignee: Samsung Electronics Co., Ltd., Kyungki-do, Rep. of Korea

[21] Appl. No.: 08/665,321

[22] Filed: Jun. 18, 1996

[30] Foreign Application Priority Data

Nov. 20, 1995 [KR] Rep. of Korea ............. 95-42281

[51] Int. Cl.⁶ ................................................. G02F 1/136
[52] U.S. Cl. ................................................... 349/42
[58] Field of Search ......................... 349/46, 42, 138, 349/122

[56] References Cited

U.S. PATENT DOCUMENTS

| | | | |
|---|---|---|---|
| 5,191,453 | 3/1993 | Okumura | 359/59 |
| 5,334,860 | 8/1994 | Naito | 349/46 |
| 5,397,719 | 3/1995 | Kim et al. | 437/40 |
| 5,483,082 | 1/1996 | Takizawa et al. | 257/59 |
| 5,491,347 | 2/1996 | Allen et al. | 257/59 |

*Primary Examiner*—William L. Sikes
*Assistant Examiner*—James Dudek
*Attorney, Agent, or Firm*—Myers Bigel Sibley & Sajovec

[57] ABSTRACT

Methods of forming liquid crystal display devices include the steps of forming a gate line and a gate electrode on a face of a transparent substrate and then forming an insulating layer (e.g., $Si_3N_4$) on the gate line and gate electrode. Formation of a thin film transistor (TFT) preferably comprising the gate electrode, amorphous silicon active regions and source and drain electrodes, is then completed on the insulating layer. To facilitate reduction of the number of masking steps needed to fabricate the display devices, a gate pad layer (e.g., indium tin oxide) is formed directly on the gate line by opening a window in the insulating layer and thereby eliminating an intermediate step (and associated masking step) of patterning the conductive material used to form the drain and source electrodes on the gate line before forming the gate pad layer. To inhibit formation of hillocks (and potential electrical "shorts" caused thereby) and minimize signal delays associated with the gate lines and electrodes, the gate lines and gate electrodes undergo a novel anodic oxidation step. In particular, the gate lines and gate electrodes are preferably formed to comprise a plurality of layers including an aluminum or related alloy first layer, a tantalum or related alloy second layer on the first layer and an anodic oxide containing tantalum (e.g., $TaO_5$,) top layer.

21 Claims, 13 Drawing Sheets

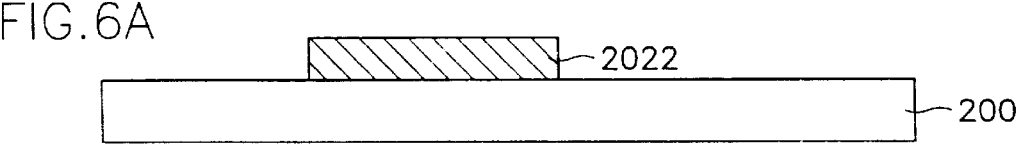
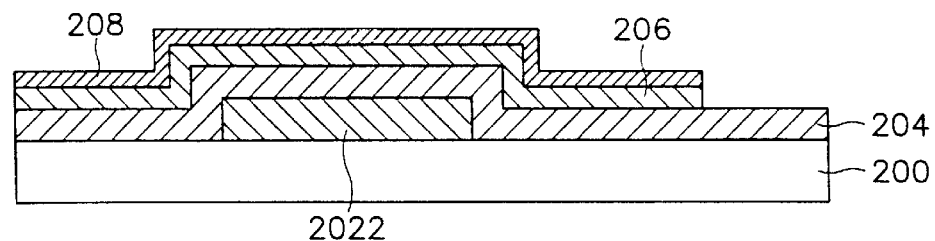
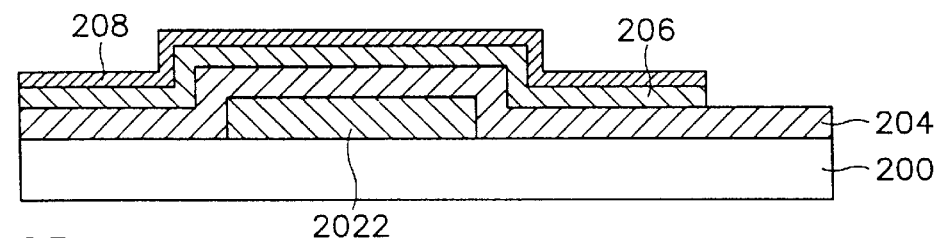
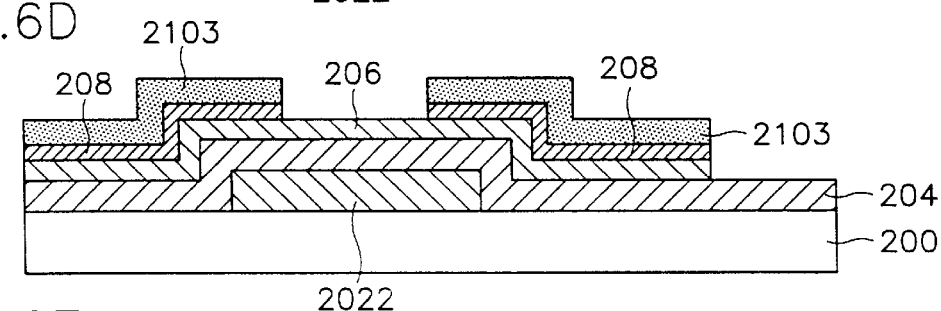
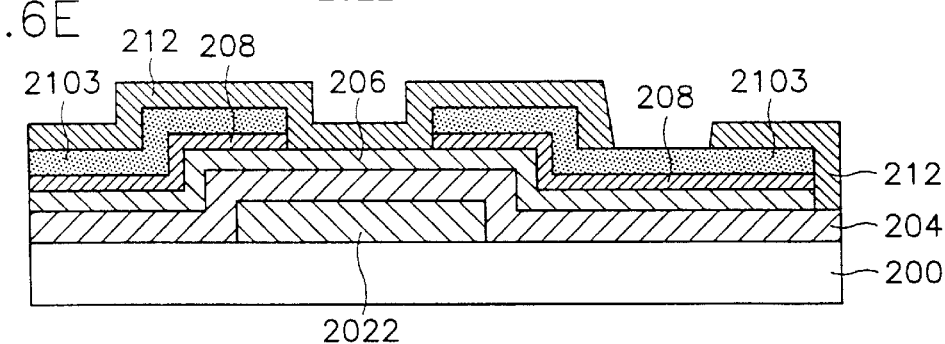
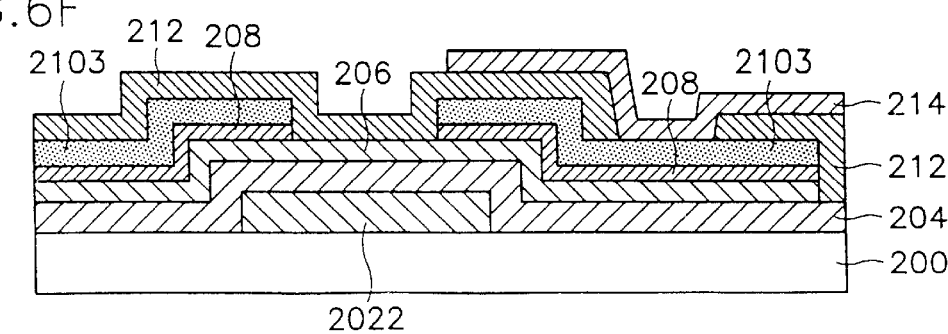

METHODS OF FORMING LIQUID CRYSTAL DISPLAY DEVICES, AND DEVICES FORMED THEREBY

FIELD OF THE INVENTION

The present invention relates to display devices and methods of fabrication, and more particularly to liquid crystal display devices and methods of forming liquid crystal display devices.

BACKGROUND OF THE INVENTION

At present, the dominant methods for fabricating liquid crystal display devices (LCD) and panels are the methods based on amorphous silicon (a-Si) thin film transistor (TFT) technologies. Using these technologies, high quality image displays of substantial size can be fabricated using low temperature processes. As will be understood by those skilled in the art, conventional LCD devices typically include a transparent (e.g., glass) substrate with an array of thin film transistors thereon, pixel electrodes, orthogonal gate and data lines, a color filter substrate and liquid crystal material between the transparent substrate and color filter substrate. The use of a-Si TFT technology typically also requires the use of separate peripheral integrated circuitry to drive the gates and sources of the TFTs in the array. Therefore, there is typically provided a large number of pads for connecting the gate lines, which are coupled to the TFT gate electrodes, and data lines to the peripheral drive circuitry.

A method of forming one type of a-Si TFT LCD display panel typically begins with the formation of a metal layer to be used for the gate electrodes and lines, on a transparent substrate. However, in large displays, signal delays in the gate lines can significantly degrade the uniformity of images in the display panel. Accordingly, the RC-time constant derived from the line resistance and capacitance should be minimized. In addition, to inhibit the formation of defects in the panel caused by electrical shorts, it is necessary to prevent hillock formation. One method for inhibiting hillock formation includes the step of performing an anodic oxidation of the gate electrodes and lines to form, for example, an oxide surface layer such as $Al_2O_3$ on an aluminum electrode or line. A more complete description of an anodic oxidation technique and method of forming a display panel is provided in U.S. Pat. No. 5,397,719 to Kim et al., entitled Method for Manufacturing a Display Panel, which is commonly assigned to the assignee of the present application, the disclosure of which is hereby incorporated herein by reference.

Referring now to FIGS. 1A–1G and 2A–2G, another method of forming a TFT LCD display panel according to the prior art will be described. In particular, as illustrated by FIGS. 1A and 2A, a gate metallization layer is initially deposited on a substrate 10. Then, a gate line, a first gate pad 121 and a gate electrode 122 are patterned by etching the gate metallization layer using a first mask (not shown). As illustrated by FIGS. 1B and 2B, an anodic oxidation layer 14 is formed on the gate electrode 122 and portion of the first gate pad 121, using a second mask (not shown). Then, as illustrated by FIGS. 1C and 2C, an insulating layer 20 is formed on the first gate pad 121 and gate electrode 122. In addition, an amorphous silicon layer 16 (a-Si) and N+amorphous silicon layer 18 are also formed in sequence and patterned on the insulating layer 20, opposite the gate electrode 122, using a third mask (not shown). A fourth mask (not shown) is then used to etch a portion of the insulating layer 20) which extends over the first gate pad 121, as illustrated by FIGS. 1D and 2D.

Referring now to FIGS. 1E and 2E, metallization is then deposited and patterned by performing an etching step using a fifth mask (not shown). Upon completion of this etching step, a data pad, a data line and a source electrode 222 portion of the data line, a drain electrode 223 and second gate pad 221 are formed. The N+amorphous silicon layer 18 is also etched to expose a portion of the underlying amorphous silicon layer 16, using the source electrode 222 and drain electrode 223 as a mask. As illustrated by FIGS. 1F and 2F, a passivation layer 24 is then deposited and etched to expose a portion of the second gate pad 221 and a portion of the drain electrode 223, using a sixth mask (not shown). The TFT device is then completed, as illustrated by FIGS. 1G and 2G, by depositing a transparent conductive material and then patterning the transparent conductive material using a seventh mask (not shown) to form the third gate pad 261 (on the second gate pad 221) and transparent pixel electrode 262.

Unfortunately, notwithstanding these above methods of forming LCD devices, a large number of masking and associated etching steps are typically required to form the devices and hillock formation is still a prevalent parasitic which can degrade device performance.

SUMMARY OF THE INVENTION

It is therefore an object of the present invention to provide improved methods of forming liquid crystal display devices, and devices formed thereby.

It is another object of the present invention to provide methods of forming liquid crystal display devices which require a reduced number of masking steps, and devices formed thereby.

It is a further object of the present invention to provide methods of forming liquid crystal display devices having gate electrodes which are free from hillocks, and devices formed thereby.

These and other objects, features and advantages of the present invention are provided by methods of forming liquid crystal display devices which in a preferred embodiment includes the initial steps of forming a gate line and a gate electrode on a face of a transparent substrate and then forming an insulating layer (e.g., $Si_3N_4$) on the gate line and gate electrode. Formation of a thin film transistor (TFT) preferably comprising the gate electrode, amorphous silicon active regions and source and drain electrodes, is then completed on the insulating layer. However, to facilitate reduction of the number of masking steps needed to fabricate the display devices, a gate pad layer (e.g., indium tin oxide) is formed directly on the gate line by opening a window in the insulating layer and thereby eliminating an intermediate step (and associated masking step) of patterning the conductive material used to form the drain and source electrodes on the gate line before forming the gate pad layer. To inhibit formation of hillocks (and potential electrical "shorts" caused thereby) and minimize signal delays associated with the gate lines and electrodes, the gate lines and gate electrodes undergo an anodic oxidation step. In particular, the gate lines and gate electrodes are preferably formed to comprise a plurality of layers including an aluminum or related alloy first layer, a tantalum or related alloy second layer on the first layer and an anodic oxide top layer containing tantalum (e.g., $TaO_5$).

BRIEF DESCRIPTION OF THE DRAWINGS

FIGS. 6A–6F illustrate schematic cross-sectional views of intermediate structures illustrating a method of forming a liquid crystal display device comprising a thin film transistor, according to a second embodiment of the present invention.

DESCRIPTION OF PREFERRED EMBODIMENTS

Figure 1A:
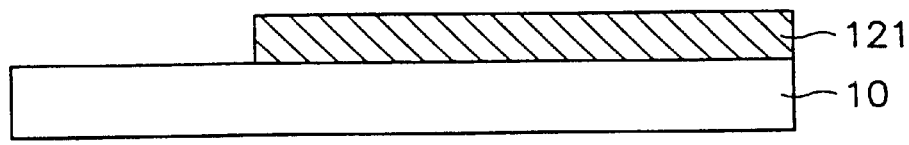
FIGS. 1A–G illustrate schematic cross-sectional views of intermediate structures illustrating a method of forming a gate pad for a liquid crystal display device, according to the prior art.
Figure 1B:
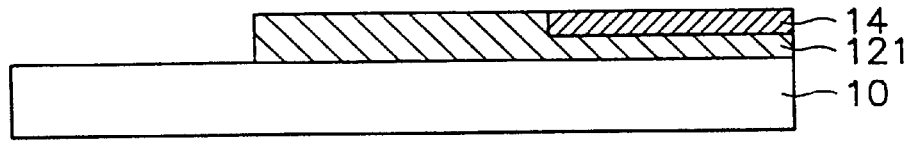
Figure 1C:
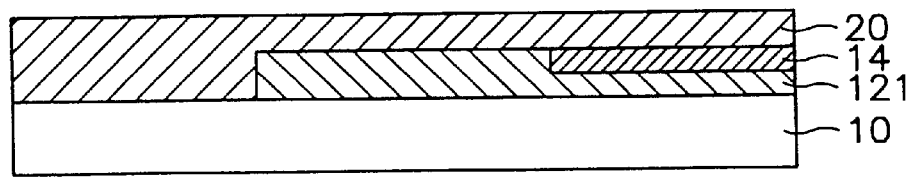
Figure 1D:
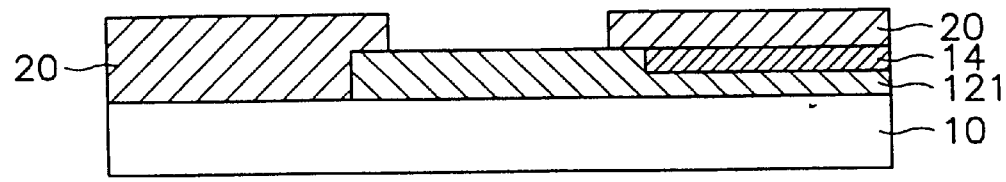
Figure 1E:
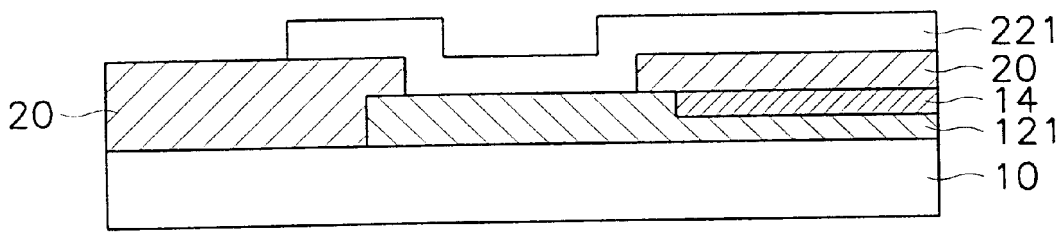
Figure 1F:
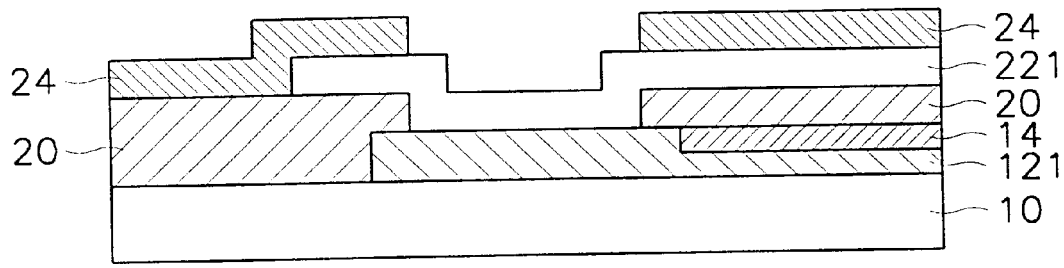
Figure 1G:
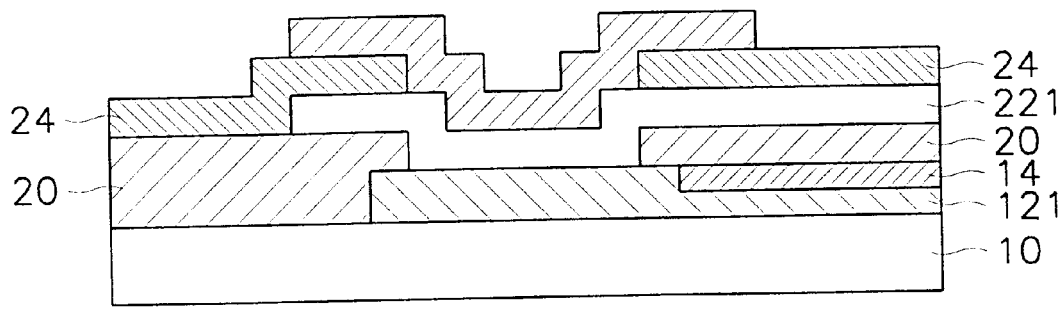
Figure 2A:
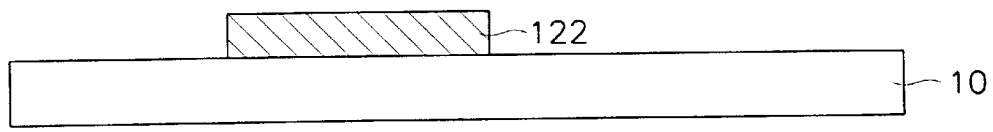
FIGS. 2A–2G illustrate schematic cross-sectional views of intermediate structures illustrating a method of forming a liquid crystal display device comprising a thin film transistor, according to the prior art.
Figure 2B:
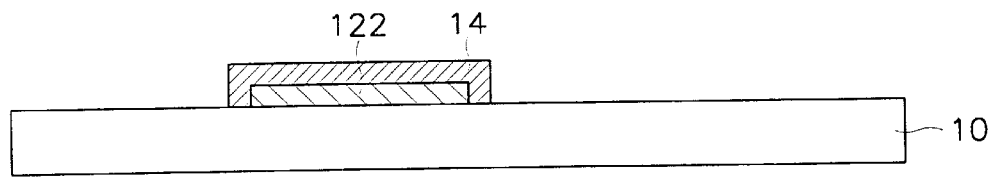
Figure 2C:
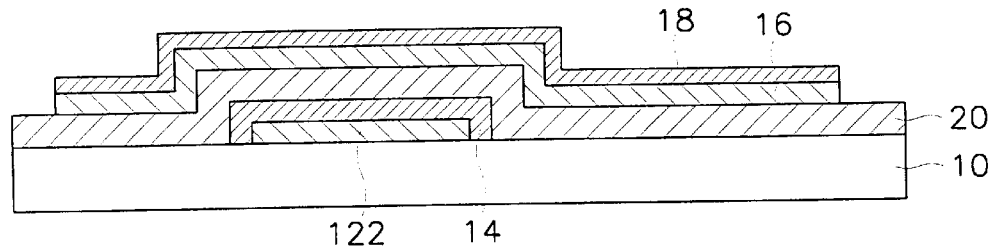
Figure 2D:
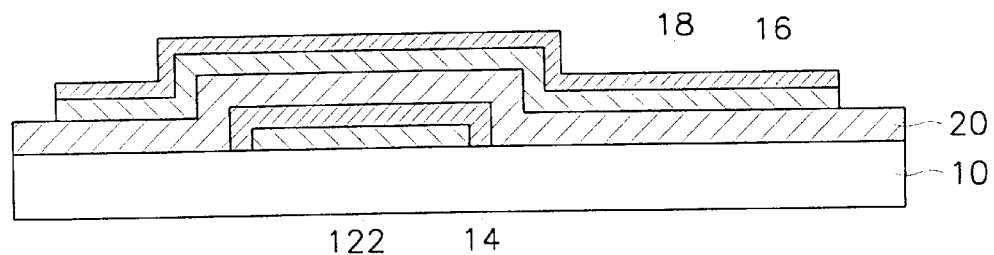
Figure 2E:
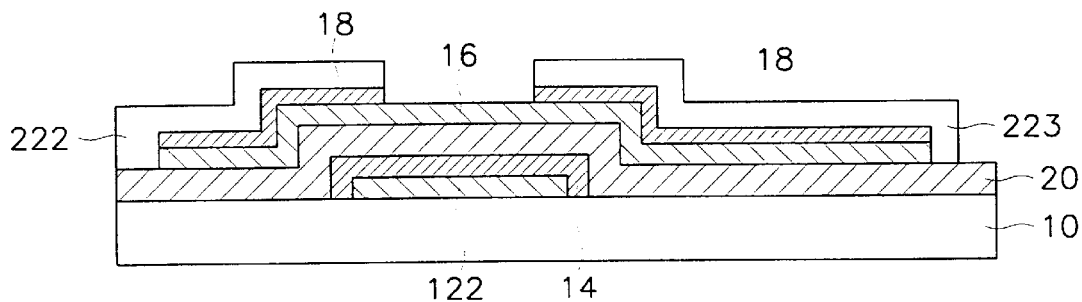
Figure 2F:
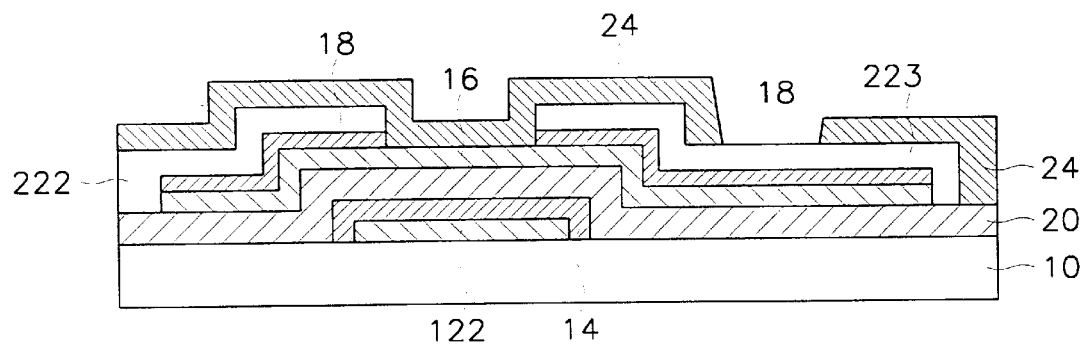
Figure 2G:
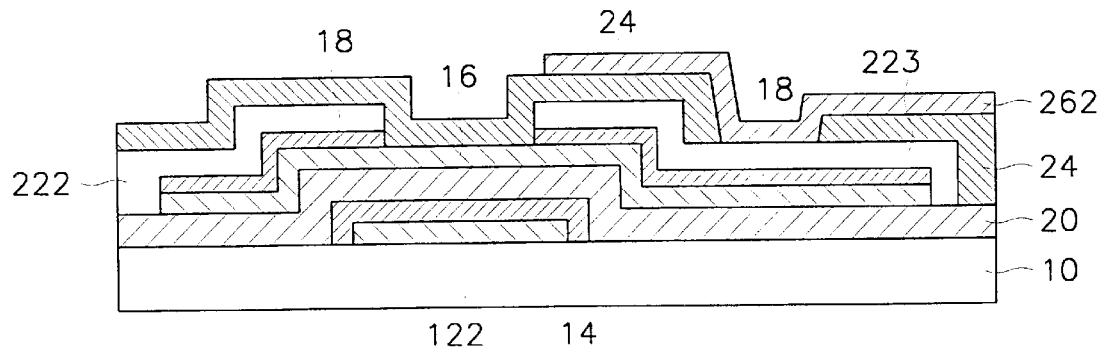

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. Moreover, the terms "first conductivity type" and "second conductivity type" refer to opposite conductivity types such as P or N-type, however, each embodiment described and illustrated herein includes its complementary embodiment as well.

Figure 3A:
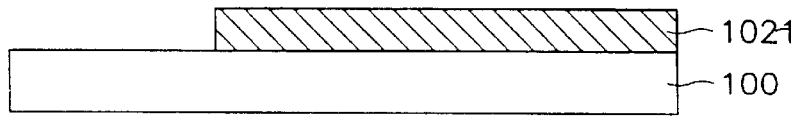
FIGS. 3A–3F illustrate schematic cross-sectional views of intermediate structures illustrating a method of forming a gate pad for a liquid crystal display device, according to a first embodiment of the present invention.
Figure 3B:
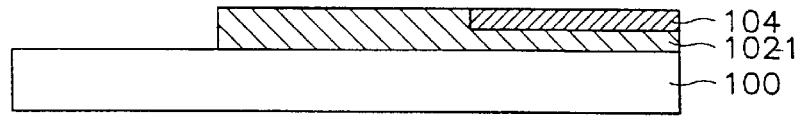
Figure 3C:
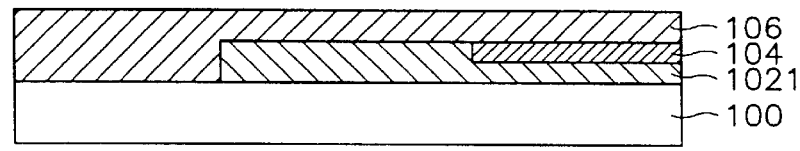
Figure 3D:
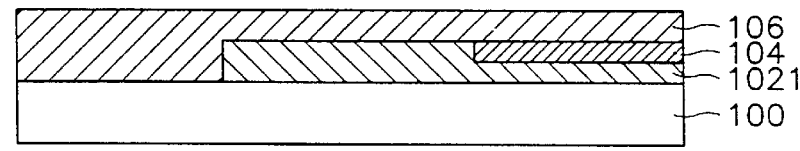
Figure 3E:
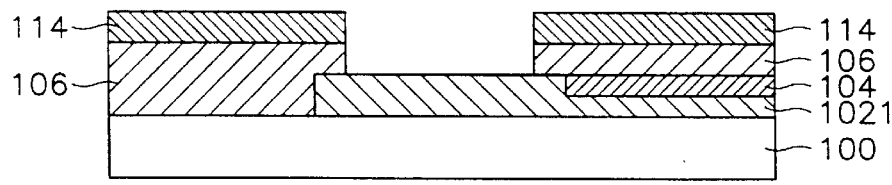
Figure 3F:
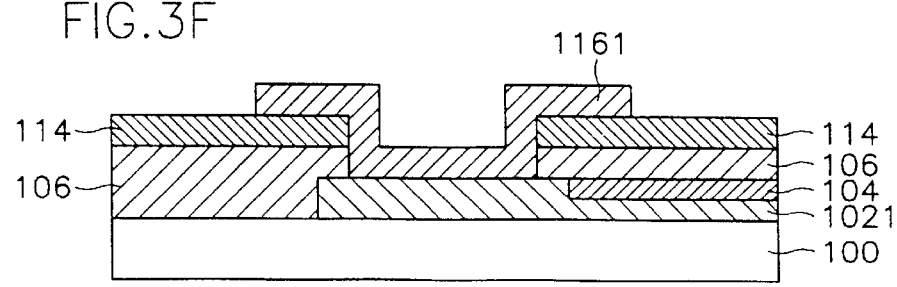
Figure 4A:
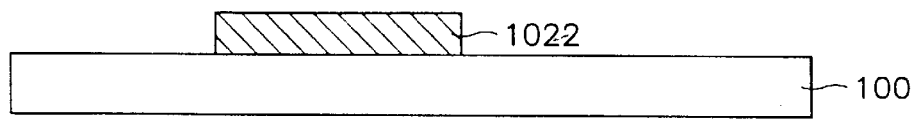
FIGS. 4A–4F illustrate schematic cross-sectional views of intermediate structures illustrating a method of forming a liquid crystal display device comprising a thin film transistor, according to a first embodiment of the present invention.

Referring now to FIGS. 3A–3F and 4A–4F, a method of forming a liquid crystal display device according to a first embodiment of the present invention, will be described. In particular, FIGS. 3A and 4A illustrate the steps of forming a first gate pad 1021 and a gate electrode 1022 of a thin film transistor (TFT) by patterning (e.g., etching) a gate metallization layer on a face of a transparent substrate 100 (e.g., glass) using a first mask. The gate metallization layer preferably comprises a suitable metal which can be oxidized, such as aluminum (Al), or a alloy thereof (e.g., Al—Si, Al—Pd, Al—Ni, Al—Ge or Al—W), Mo, Ti, Ta and Mo—Ta. According to the preferred embodiment of the present invention, the gate metallization layer comprises an alloy of aluminum such as Al-Nd using neodymium or Al—Pt using platinum. Preferred etchants for patterning gate metallization layers containing aluminum include $CH_3COOH/HNO_3/H_3PO_4/H_2O$.

Figure 4B:
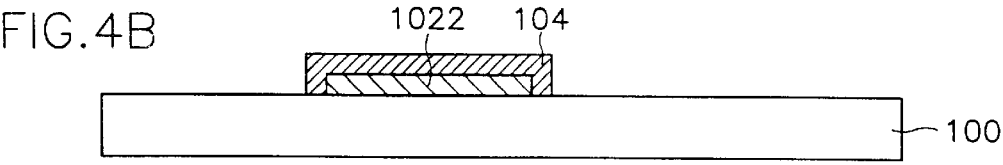
Figure 4C:
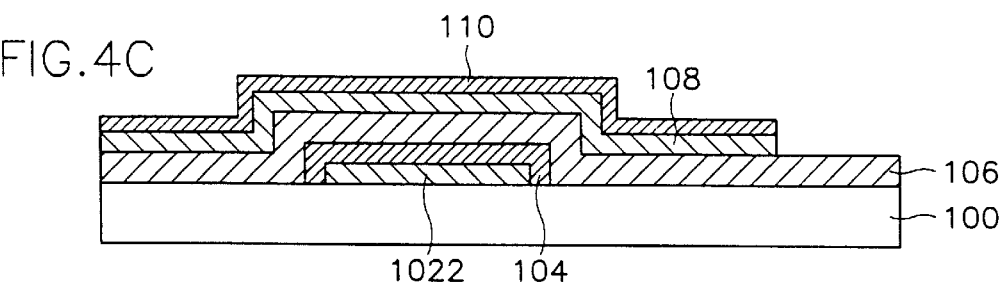
Figure 4D:
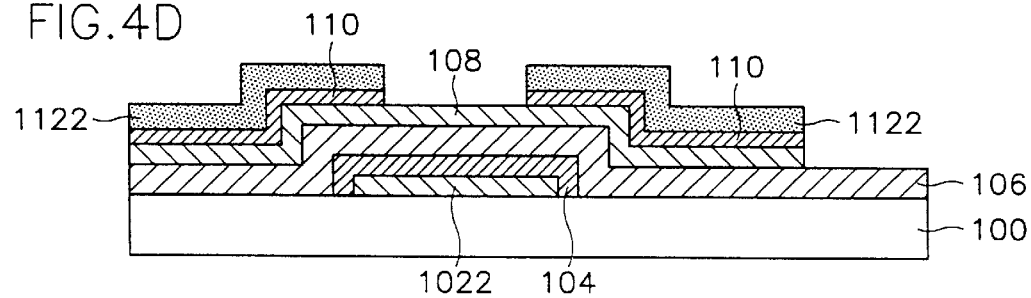
Figure 4E:
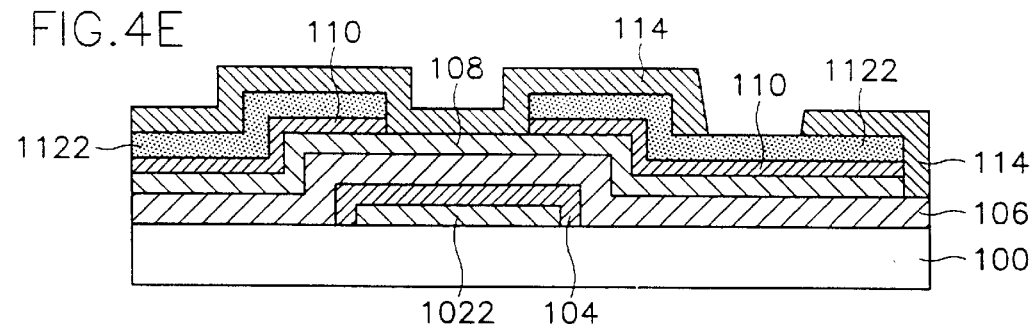

Referring now to FIGS. 3B and 4B, an anodic oxidation layer 104 is then formed on a portion of the first gate pad 1021 and on the gate electrode 1022 using a second mask. The step of forming an anodic oxidation layer may be carried out in a solution containing 3% tartaric acid having a pH of 7.0±0.5, using $NH_4OH$ as an additive and ethyleneglycol as a diluent. As will be understood by those skilled in the art, during the anodic oxidation step, the first gate pad 1021 and gate electrode 1022 serve as an anode and stainless steel or platinum (Pt) can be used as a cathode, with anodization voltages of 140 Volts and current densities of 0.5–5 $mA/cm^2$ being typical. As illustrated by FIGS. 3C and 4C, an insulating layer 106 (e.g., $Si_3N_4$) is then applied to the face of the substrate 100 and onto the first gate pad 1021, gate electrode 1022 and anodic oxidation layer 104. As illustrated best by FIG. 4C, an amorphous silicon layer 108 (a-Si) and an N+ amorphous silicon layer 110 are then formed in sequence on the insulating layer 106 and patterned to form the active regions of the thin film transistor, using a third mask.

Referring now to FIGS. 3D–4D, a source/drain metallization layer (e.g., Cr) is then formed on the amorphous silicon layers and patterned to form source and drain electrodes 1122, data lines and data pads, using a fourth mask, however the source/drain metallization layer is not patterned to extend opposite the portion of the first gate pad which has not been oxidized. A portion of the N+ amorphous silicon layer 110 is also etched in a self-aligned manner using the patterned source/drain metallization layer as a mask. As illustrated by FIGS. 3E and 4E, a passivation layer 114 is then deposited and patterned using a fifth mask to expose a portion of the drain electrode 1122 and expose a portion of the insulating layer 106 which extends opposite the portion of the first gate pad 1021 which has not been oxidized. During this step the exposed insulating layer 106 is also etched to expose a portion of the first gate pad 1021 which is not covered by the anodic oxidation layer 104.

Figure 4F:
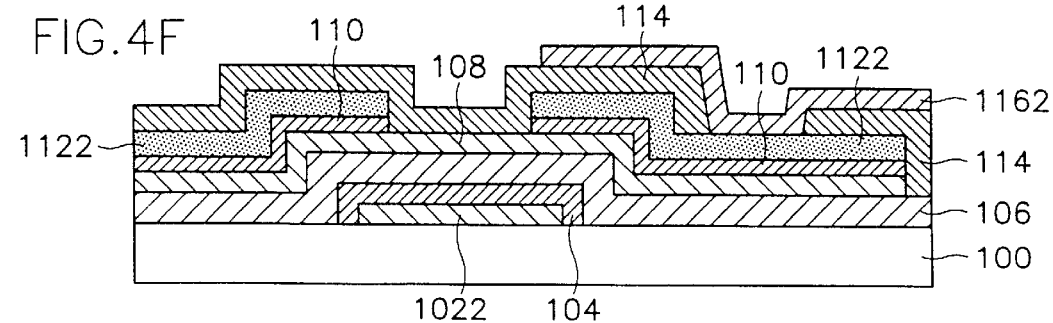

The device is then completed, as illustrated by FIGS. 3F and 4F, by depositing an optically transparent conductive layer, such as a layer of indium tin oxide (ITO), on the passivation layer and then patterning the transparent conductive layer to form a pixel electrode 1162 (in ohmic contact with the drain electrode 1122) and a second gate pad 1161 (in ohmic contact with the first gate pad 1021), by etching the conductive layer using a sixth mask. Thus, according to this first embodiment, the second gate pad 1161 can be formed in direct electrical and physical contact with the first gate pad 1021 without the need of a intermediate gate pad layer, as required by the prior art. In addition, the insulating layer 106 and passivation layer 114 are preferably etched during the same step to expose the first gate pad 1021 and thereby eliminate one of the masking steps required by the prior art method of FIGS. 1A–1G and 2A–2G.

Figure 5A:
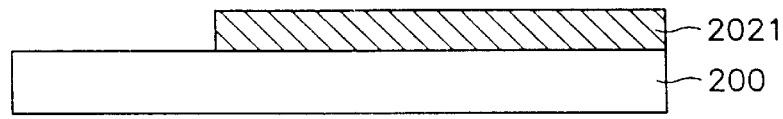
FIGS. 5A–5F illustrate schematic cross-sectional views of intermediate structures illustrating a method of forming a gate pad for a liquid crystal display device, according to a second embodiment of the present invention.
Figure 5B:
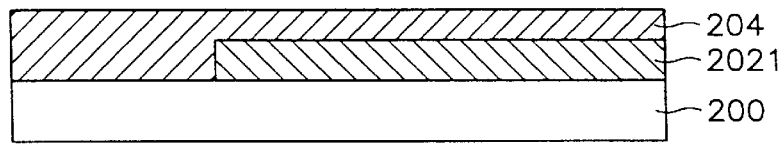

Referring now to FIGS. 5A–5F and 6A–6F, a method of forming a liquid crystal display device according to a second embodiment of the present invention, will be described. In particular, FIGS. 5A and 6A illustrate the steps of forming a first gate pad 2021 and a gate electrode 2022 of a thin film transistor (TFT) by patterning (e.g., etching) a gate metallization layer on a face of a transparent substrate 200 (e.g., glass) using a first mask. Referring now to FIGS. 5B and 6B, an insulating layer 204 is then applied to the face of the substrate 200 and onto the first gate pad 2021 and gate electrode 2022. As illustrated best by FIG. 6B, an amorphous silicon layer 206 (a-Si) and an N+ amorphous silicon layer 208 are then formed in sequence on the insulating layer 204 and patterned to form the active regions of the thin film transistor, using a second mask.

Figure 5C:
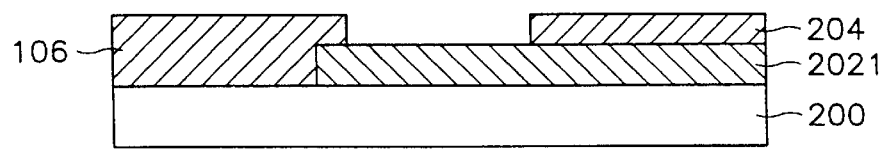
Figure 5D:
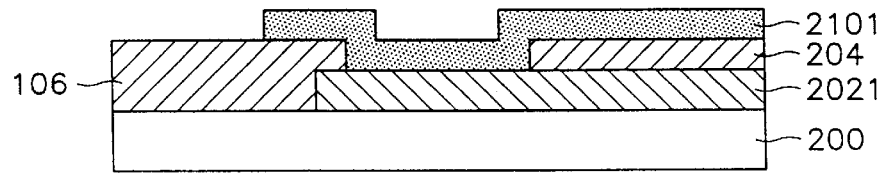
Figure 5E:
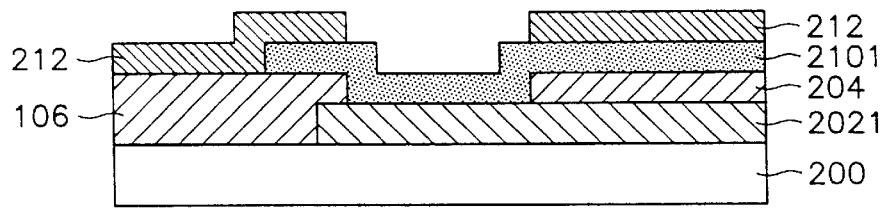
Figure 5F:
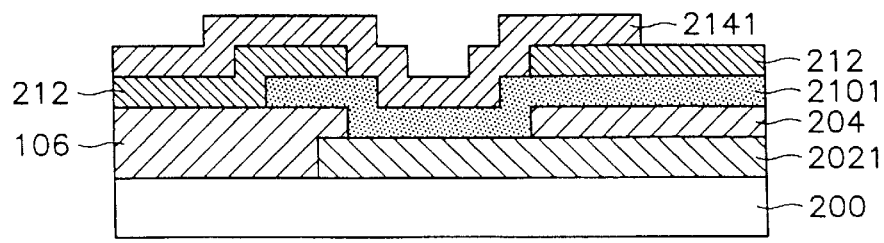

Referring now to FIGS. 5C and 6C, a portion of the insulating layer 204 overlying the first gate pad 2021 is the etched to expose the first gate pad 2021 using a third mask. A source/drain metallization layer (e.g., Cr) is then formed on the amorphous silicon layers and onto the exposed first gate pad 2021 and patterned to form a second gate pad 2101 and source and drain electrodes 2103, data lines and data pads, using a fourth mask. A portion of the N+ amorphous silicon layer 208 is also etched in a self-aligned manner to expose the amorphous silicon layer 206, using the patterned source/drain metallization layer as a mask. As illustrated by FIGS. 5E and 6E, a passivation layer 212 is then deposited and patterned using a fifth mask to expose a portion of the drain electrode 1122 and expose a portion of the second gate pad 2101. The device is then completed, as illustrated by FIGS. 5F and 6F, by depositing an optically transparent conductive layer, such as a layer of indium tin oxide (ITO), on the passivation layer and then patterning the transparent conductive layer to form a pixel electrode 214 (in ohmic contact with the drain electrode 2103) and a third gate pad 2141 (in ohmic contact with the second gate pad 2101), by etching the conductive layer using a sixth mask.

Figure 7A:
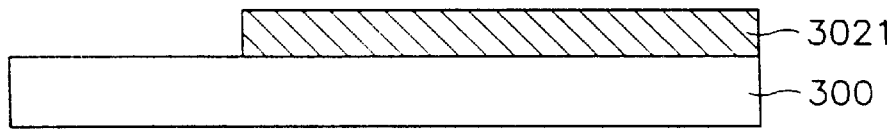
FIGS. 7A–7E illustrate schematic cross-sectional views of intermediate structures illustrating a method of forming a gate pad for a liquid crystal display device, according to a third embodiment of the present invention.
Figure 7B:
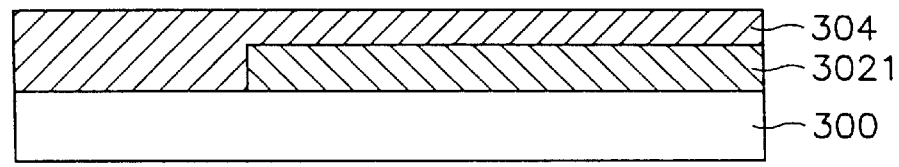
Figure 7C:
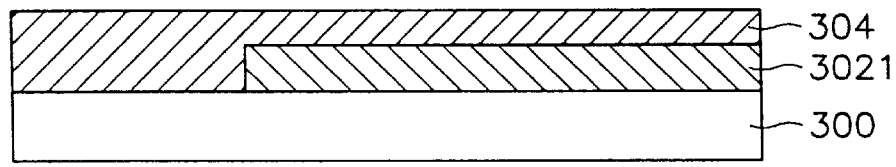
Figure 7D:
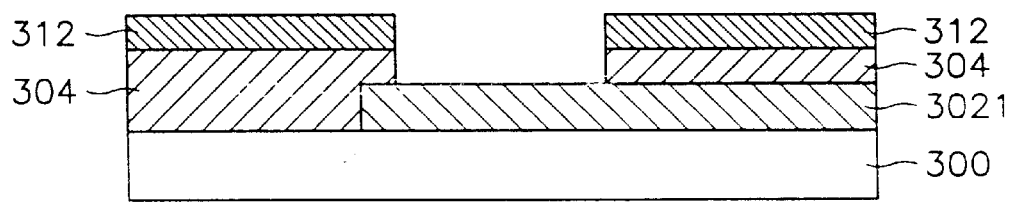
Figure 7E:
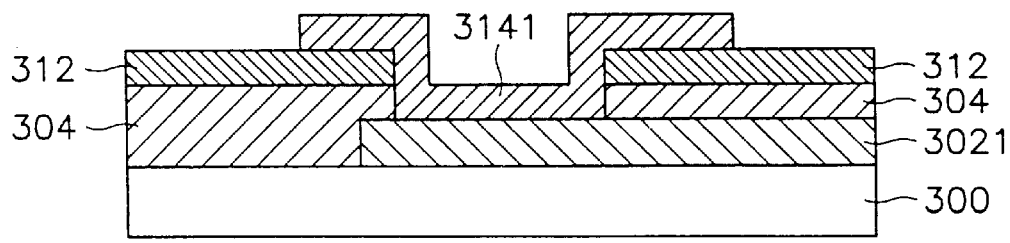
Figure 8A:
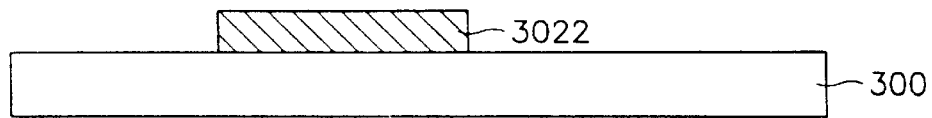
FIGS. 8A–8E illustrate schematic cross-sectional views of intermediate structures illustrating a method of forming a liquid crystal display device comprising a thin film transistor, according to a third embodiment of the present invention.
Figure 8B:
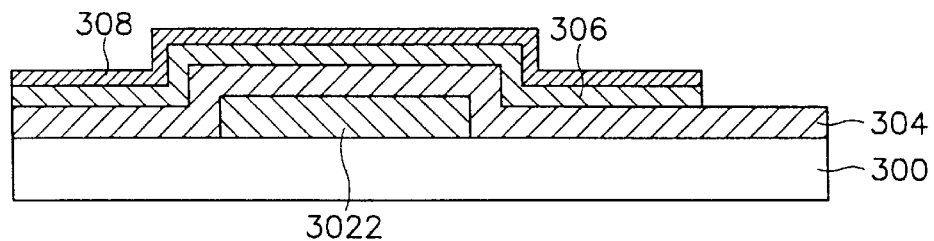
Figure 8C:
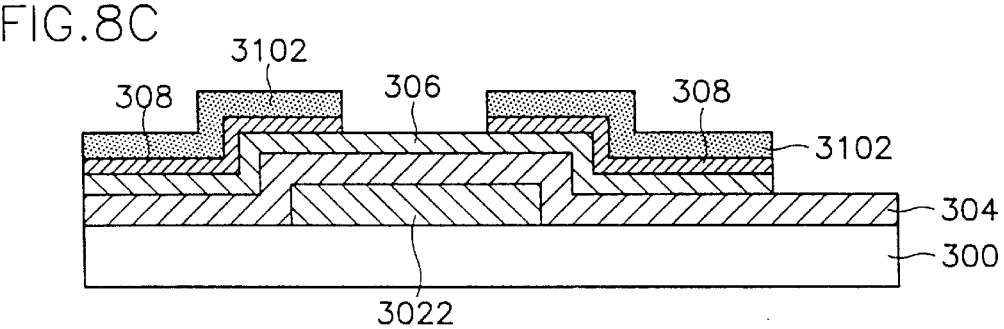
Figure 8D:
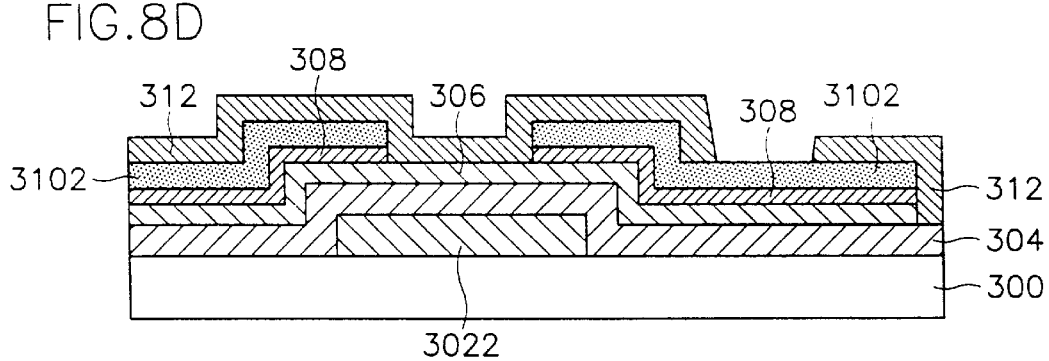
Figure 8E:
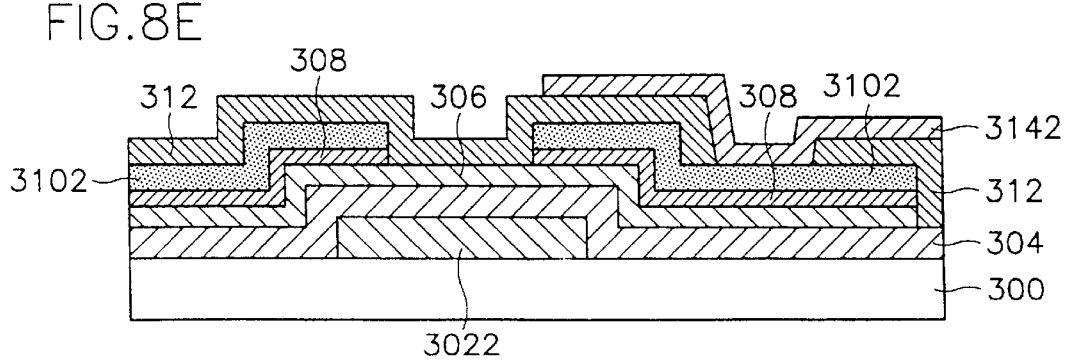

Referring now to FIGS. 7A–7E and 8A–8E, a method of forming a liquid crystal display device according to a third embodiment of the present invention, will be described. In particular, FIGS. 7A and 8A illustrate the steps of forming a first gate pad 3021 and a gate electrode 3022 of a thin film transistor (TFT) by patterning (e.g., etching) a gate metallization layer on a face of a transparent substrate 300 (e.g., glass) using a first mask. According to the preferred embodiment of the present invention, the gate metallization layer comprises an alloy of aluminum such as Al—Nd using neodymium or Al—Pt using platinum. Referring now to FIGS. 7B and 8B, an insulating layer 304 is then applied to the face of the substrate 300 and onto the first gate pad 3021 and gate electrode 3022. As illustrated best by FIG. 8B, an amorphous silicon layer 306 (a-Si) and an N+ amorphous silicon layer 308 are then formed in sequence on the insulating layer 304 and patterned to form the active regions of the thin film transistor, using a second mask.

Referring now to FIGS. 7C–8C, a source/drain metallization layer preferably comprising Cr metal is then formed on the amorphous silicon layers and patterned to form source and drain electrodes 3102, data lines and data pads, using a third mask, however the source/drain metallization layer is not patterned to extend opposite the first gate pad 3021. A portion of the N+ amorphous silicon layer 308 is also etched in a self-aligned manner using the patterned source/drain metallization layer as a mask. A passivation layer 312 is then deposited and patterned using a fourth mask to expose a portion of the drain electrode 3102 and expose a portion of the insulating layer 304, as illustrated by FIGS. 7D and 8D. During this step, the exposed insulating layer 304 is also etched to expose a portion of the first gate pad 3021. The device is then completed, as illustrated by FIGS. 7E and 8E, by depositing an optically transparent conductive layer, such as a layer of indium tin oxide (ITO), on the passivation layer and then patterning the transparent conductive layer to form a pixel electrode 3142 (in ohmic contact with the drain electrode 3102) and a second gate pad 3141 (in ohmic contact with the first gate pad 3021), by etching the conductive layer using a fifth mask. Thus, according third embodiment, the second gate pad 3141 can be formed in direct electrical and physical contact with the first gate pad 3021 without the need of a intermediate gate pad layer, as required by the prior art. In addition, the insulating layer 304 and passivation layer 312 are preferably etched during the same step to expose the first gate pad 3021 and thereby reduce the number of masking steps required to forming the display device.

Figure 9A:
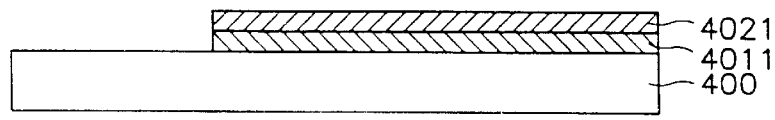
FIGS. 9A–9F illustrate schematic cross-sectional views of intermediate structures illustrating a method of forming a gate pad for a liquid crystal display device, according to a fourth embodiment of the present invention.
Figure 9B:
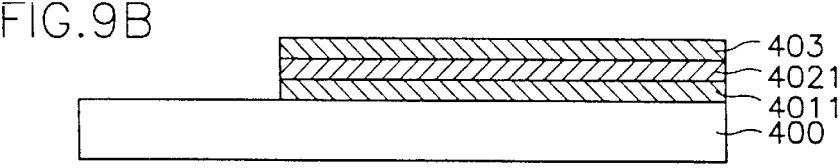
Figure 9C:
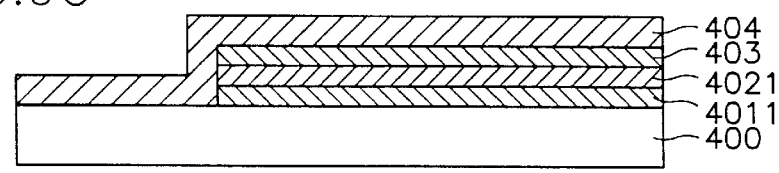
Figure 9D:
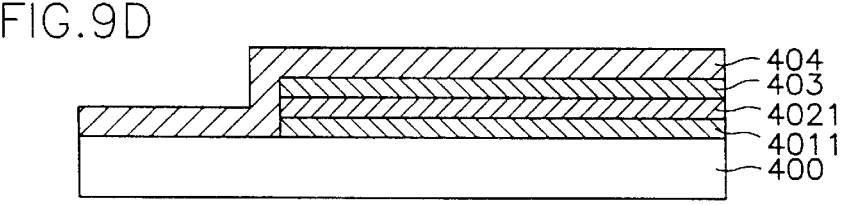
Figure 9E:
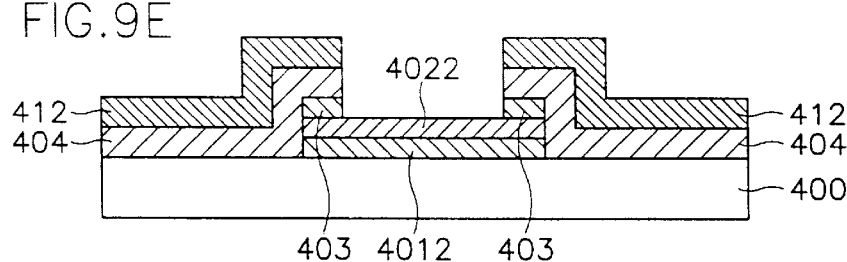
Figure 9F:
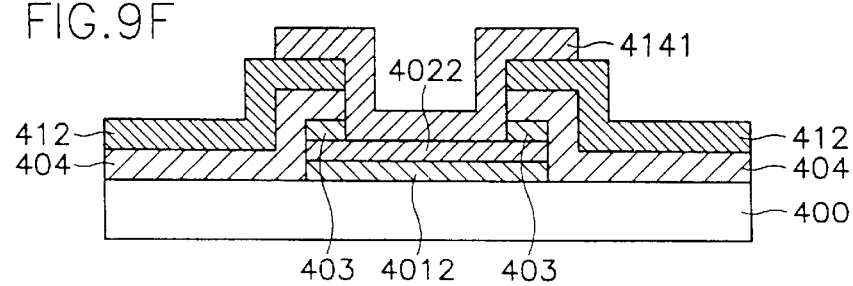
Figure 10A:
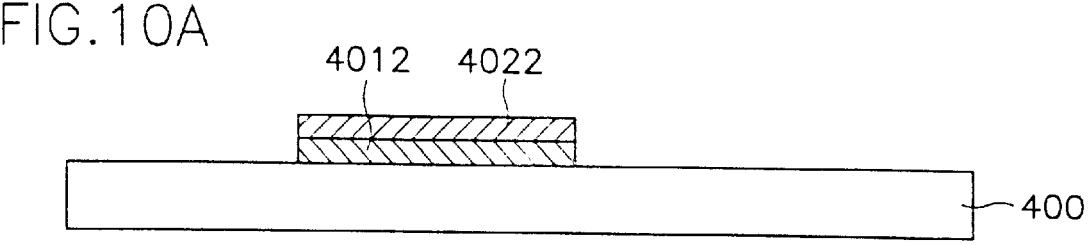
FIGS. 10A–10F illustrate schematic cross-sectional views of intermediate structures illustrating a method of forming a liquid crystal display device comprising a thin film transistor, according to a fourth embodiment of the present invention.
Figure 10B:
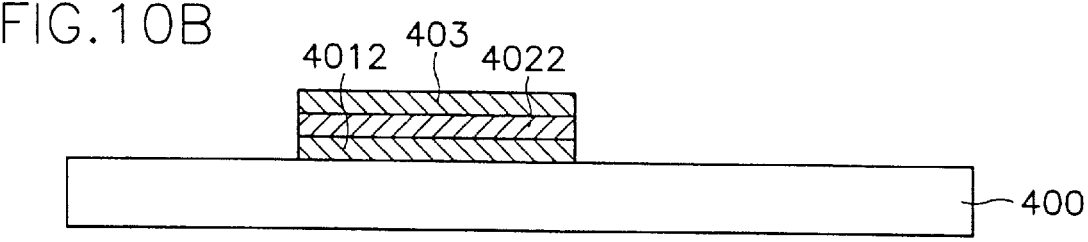
Figure 10C:
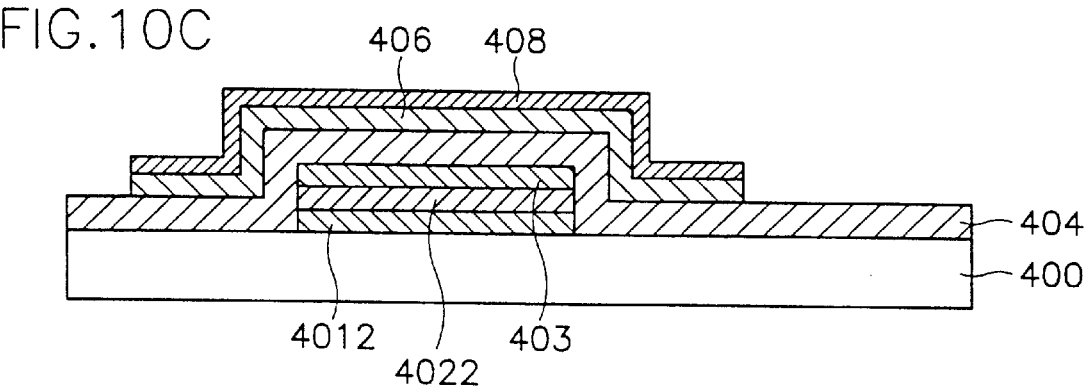
Figure 10D:
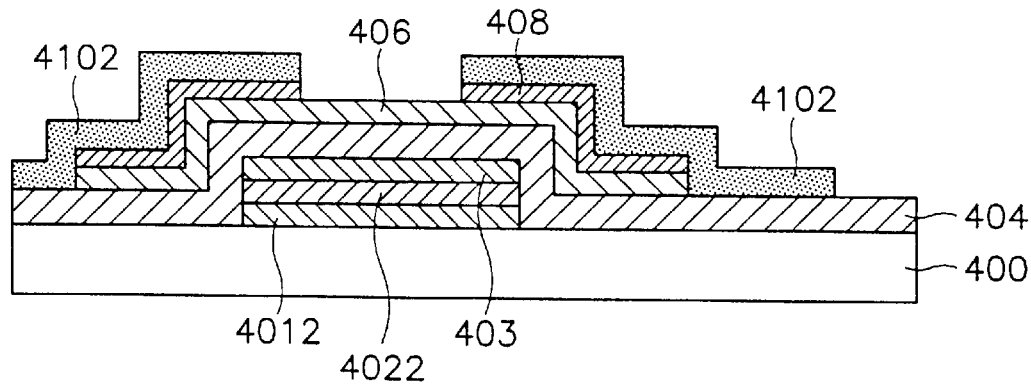

Referring now to FIGS. 9A–9F and 10A–10F, a method of forming a liquid crystal display device according to a fourth embodiment of the present invention, will be described. In particular, FIGS. 9A and 10A illustrate the steps of forming a preferred multilayered first gate pad and a multilayered gate electrode of a thin film transistor (TFT) on a face of a transparent substrate 400, to prevent hillock formation. As illustrated, a first layer preferably containing aluminum is initially formed on the substrate and then a second layer preferably containing tantalum (Ta) is formed on the first layer. These layers are then patterned by performing an etching step using a first mask, to form a first gate pad, containing a first and second layers 4011, 4021, respectively, and to form a gate electrode containing first and second layers 4012, 4022, respectively. Referring now to FIGS. 9B and 10B, an anodic oxidation layer 403, preferably comprising tantalum pentoxide (TaO$_5$), is then formed at a surface of the second layers 4021, 4022. As illustrated best by FIG. 9C and 10C, an insulating layer 404 is then formed on the first gate pad and gate electrode and then an amorphous silicon layer 406 and N+ amorphous silicon layer 408 are sequentially formed on the insulating layer 404, opposite the gate electrode, and patterned using a second mask. A source/drain metallization layer is then applied to the amorphous layers and etched to form source and drain electrodes 4102, using a third mask, as illustrated by FIGS. 9D and 10D. During this step, a portion of the N+ amorphous silicon layer 408 extending opposite the gate electrode, is also etched to expose the undoped amorphous silicon layer 406.

Figure 10E:
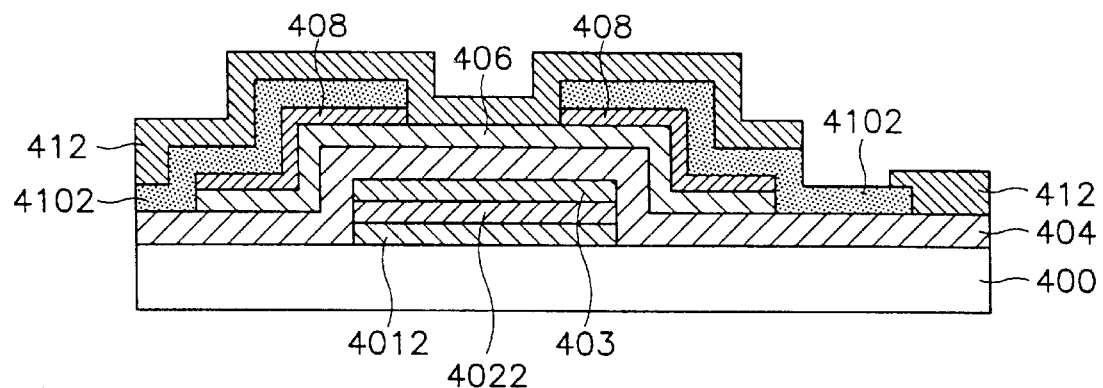

Referring now to FIGS. 9E and 10E, a passivation layer 412 is applied onto the insulating layer 404 and the drain and source electrodes 4102 and then etched using a fourth mask to expose the drain electrode 4102. During this step, the insulating layer 404 and anodic oxidation layer 403 (e.g., TaO$_5$) are also etched to preferably expose the second layer 4022 of the first gate pad. Alternatively, this etching step can also be performed to expose the first layer 4012 of the first gate pad.

Figure 10F:
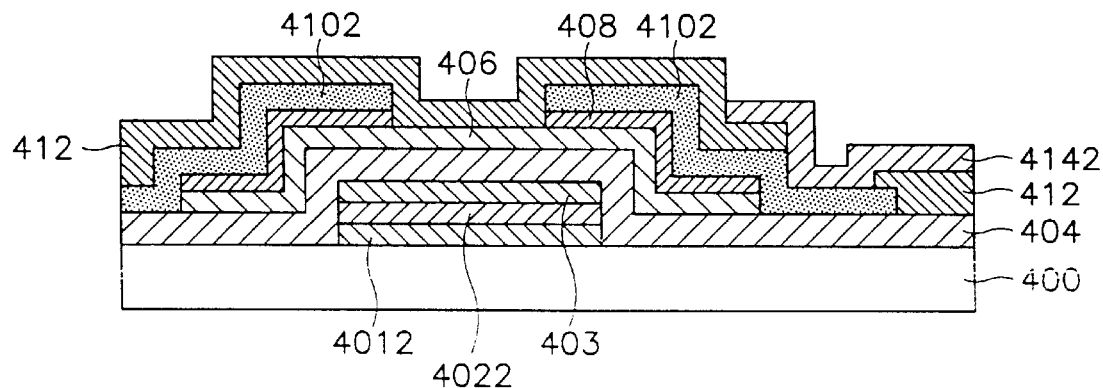

The device is then completed, as illustrated by FIGS. 9F and 10F, by depositing an optically transparent conductive layer, such as a layer of indium tin oxide (ITO), on the passivation layer 412 and then patterning the transparent conductive layer to form a pixel electrode 4142 (in ohmic contact with the drain electrode 4102) and a second gate pad 4141 (in ohmic contact with the first gate pad), by etching the conductive layer using a fifth mask. Thus, according to this fourth embodiment, the second gate pad 4141 can be formed in direct electrical and physical contact with the first gate pad without the need of a intermediate gate pad layer, as required by the prior art. In addition, because the anodic oxidation step illustrated by FIGS. 9B and 10B does not require a mask, and because the insulating layer 404, passivation layer 412 and anodic oxidation layer 403 can be etched during the same step to form the first gate pad, the method according to the fourth embodiment eliminates two of the masking steps required by the prior art method of FIGS. 1A–1G and 2A–2G. Moreover, according to the fourth embodiment of the present invention, a preferred liquid crystal display device can be formed having a multilayered gate electrode (and gate pad) which is less prone to hillock formation. The preferred multilayered gate electrode comprises a first layer of aluminum or alloy thereof and a second layer of tantalum or alloy thereof on the first layer.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of forming a liquid crystal display device, comprising the steps of:
    forming a gate line and a gate electrode of a thin film transistor on a face of a substrate;
    forming an insulating layer on the gate line and on the gate electrode;
    forming active regions of the thin film transistor on the insulating layer;
    forming a passivation layer on the insulating layer;
    patterning the passivation layer;
    removing a portion of the insulating layer to expose a first portion of the gate line, by etching the insulating layer using the patterned passivation layer as a mask; and
    forming a first conductive layer on the exposed first portion of the gate line and in ohmic contact therewith to form a gate pad.

2. The method of claim 1, wherein said insulating layer forming step is preceded by the step of forming an anodic oxidation layer on a second portion of the gate line.

3. The method of claim 2, wherein said step of removing a portion of the insulating layer to expose a first portion of the gate line comprises removing a portion of the insulating layer to expose a first portion of the gate line, but not expose the second portion of the gate line.

4. The method of claim 2, wherein said step of forming a first conductive layer on the exposed first portion of the gate line comprises forming a first conductive layer on the exposed first portion of the gate line, but not on the anodic oxidation layer.

5. The method of claim 1, wherein said step of forming active regions comprises the step of forming an amorphous silicon layer on the insulating layer, opposite the gate electrode; and wherein said step of forming a passivation layer is preceded by the step of forming a second conductive layer on the amorphous silicon layer.

6. The method of claim 5, further comprising the step of patterning the second conductive layer into separate drain and source electrodes by etching the second conductive layer using a mask.

7. The method of claim 6, wherein said step of patterning the second conductive layer into separate drain and source electrodes is followed by the step of forming an optically transparent pixel electrode in ohmic contact with the drain electrode.

8. The method of claim 7, wherein said step of patterning the passivation layer comprises patterning the passivation layer to expose the drain electrode; and wherein said step of forming an optically transparent pixel electrode comprises forming an optically transparent pixel electrode on the patterned passivation layer and in ohmic contact with the drain electrode.

9. The method of claim 6, wherein said insulating layer forming step is preceded by the step of forming an anodic oxidation layer on the gate electrode; wherein said amorphous silicon layer forming step comprises forming an undoped amorphous silicon layer on the insulating layer and then forming a doped amorphous silicon layer on the undoped amorphous silicon layer; and wherein said step of patterning the second conductive layer comprises etching the second conductive layer and the doped amorphous silicon layer.

10. A method of forming a liquid crystal display device, comprising the steps of:
    forming a gate line having first and second surface portions on a face of a substrate;
    forming an anodic oxidation layer on the second surface portion of the gate line, opposite the transparent substrate;
    forming an insulating layer on the first surface portion of the gate line and on the anodic oxidation layer;
    forming semiconductor active regions of a field effect transistor on the insulating layer;
    patterning a passivation layer on the insulating layer;
    removing a portion of the insulating layer to expose the first surface portion of the gate line by etching the insulating layer using the patterned passivation layer as a mask; and
    forming a first conductive layer which is optically transparent on the exposed first surface portion of the gate line and in contact therewith to thereby form a transparent gate pad which is electrically connected to the gate line.

11. The method of claim 10, wherein said step of removing a portion of the insulating layer is preceded by the step of forming drain and source electrodes in contact with the semiconductor active regions of the field effect transistor; and wherein said first conductive layer forming step comprises patterning an optically transparent pixel electrode on the drain electrode.

12. A method of forming a gate pad for a liquid crystal display device, comprising the steps of:
    forming a gate line on a face of a transparent substrate, said gate line comprising a first layer containing a first metal on the face and a second layer containing a second metal, different from the first metal, on the first layer;
    oxidizing a face of the second layer to form an anodic oxidation layer having a conductivity which is less than a conductivity of the second metal;
    forming an insulating layer on the anodic oxidation layer;
    removing a portion of the insulating layer to expose the anodic oxidation layer;
    removing the exposed portion of the anodic oxidation layer to expose the first or second layer; and
    forming a gate pad which is electrically connected to the gate line by forming a conductive layer on the exposed first or second layer and in ohmic contact therewith.

13. The method of claim 12, wherein the first metal is aluminum, the second metal is tantalum and the anodic oxidation layer comprises tantalum pentoxide.

14. A method of forming a gate pad for a liquid crystal display device, comprising the steps of:
    forming a gate line on a face of a transparent substrate, said gate line comprising a first layer containing a first metal on the face and a second layer containing a second metal, different from the first metal, on the first layer;

oxidizing a face of the second layer to form an anodic oxidation layer;

forming an insulating layer on the anodic oxidation layer;

patterning a passivation layer on the insulating layer;

removing a portion of the insulating layer to expose the anodic oxidation layer, by etching the insulating layer using the patterned passivation layer as a mask;

removing the exposed portion of the anodic oxidation layer to expose the first or second layer; and forming a gate pad which is electrically connected to the gate line by forming a conductive layer on the exposed first or second layer and in ohmic contact therewith.

15. A method of forming a liquid crystal display device, comprising the steps of:

forming a gate electrode of a thin film transistor on a face of a substrate, said gate electrode comprising a first layer containing a first metal on the face and a second layer containing a second metal, different from the first metal, on the first layer;

oxidizing a face of the second layer to form an anodic oxidation layer having a conductivity less than a conductivity of the second metal;

forming an insulating layer on the anodic oxidation layer;

forming an amorphous silicon layer on the insulating layer, opposite the anodic oxidation layer;

forming drain and source electrodes of the thin film transistor on the amorphous silicon layer; and forming an optically transparent pixel electrode on the drain electrode.

16. The method of claim 15, wherein the first metal is aluminum, the second metal is tantalum and the anodic oxidation layer comprises tantalum pentoxide.

17. The method of claim 16, wherein said amorphous silicon layer forming step comprises forming an first amorphous silicon layer on the insulating layer and then forming a second amorphous silicon layer having a higher conductivity than the first amorphous silicon layer, on the first amorphous silicon layer.

18. The method of claim 17, wherein said step of forming drain and source electrodes comprises etching the second amorphous silicon layer.

19. A liquid crystal display device, comprising:

a transparent substrate having a face;

a gate electrode on the face, said gate electrode comprising a first layer of aluminum or alloy thereof on the face, a second layer of tantalum or alloy thereof on the first layer and an anodic oxidation layer containing tantalum on the second layer, said anodic oxidation layer having a conductivity less than a conductivity of the second layer;

an insulating layer on said gate electrode;

an amorphous silicon layer containing dopants of first conductivity type therein, on said insulating layer;

drain and source electrodes on said amorphous silicon layer and electrically coupled thereto; and an optically transparent pixel electrode connected to said drain electrode.

20. The device of claim 19, further comprising a gate line electrically coupled to said gate electrode and comprising a first layer of aluminum or alloy thereof on the face and a second layer of tantalum or alloy thereof on the first layer; and a gate pad on the second layer of said gate line and in ohmic contact therewith.

21. The device of claim 20, wherein said gate pad comprises indium tin oxide.

* * * * *